UNITED STATES PATENT OFFICE.

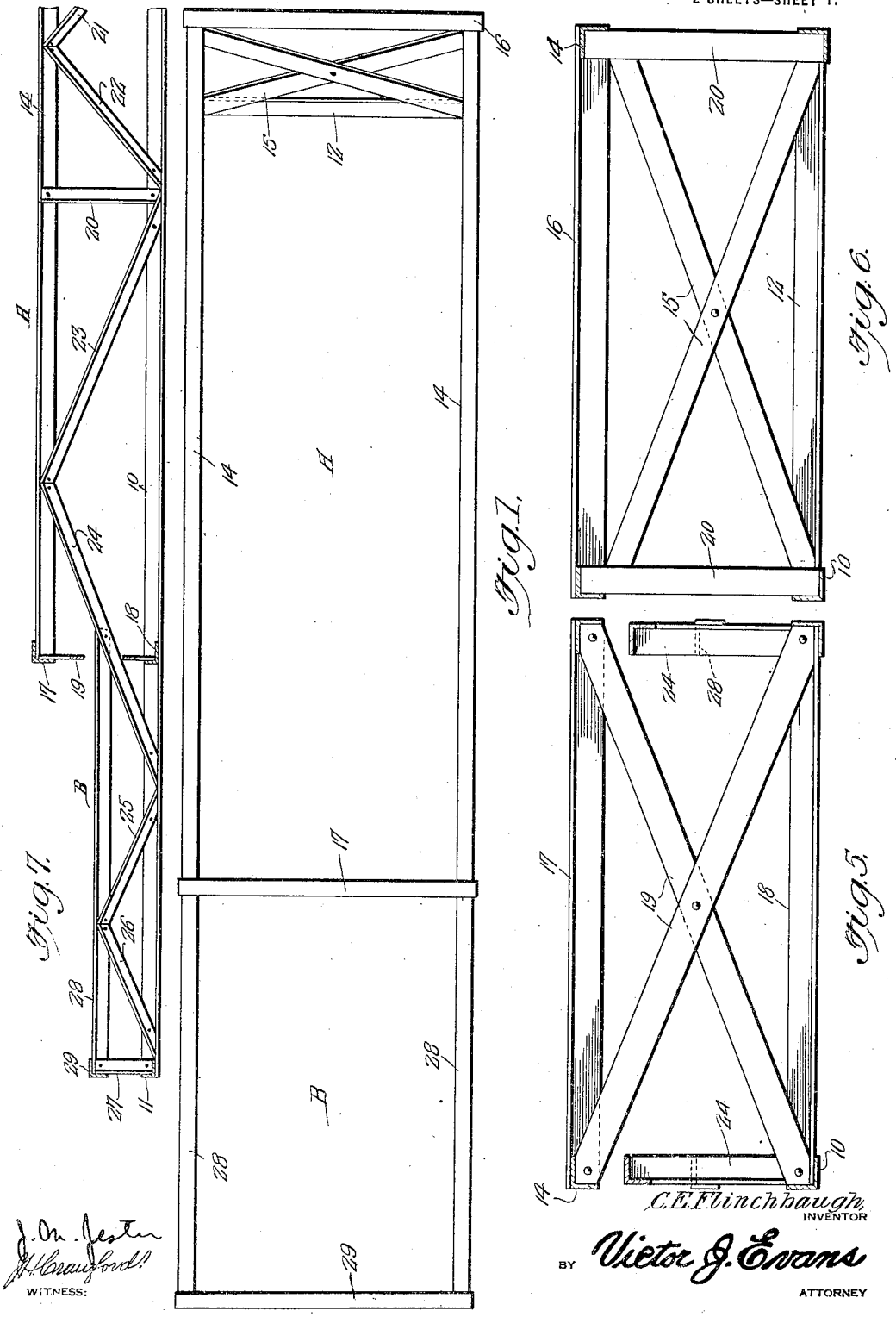

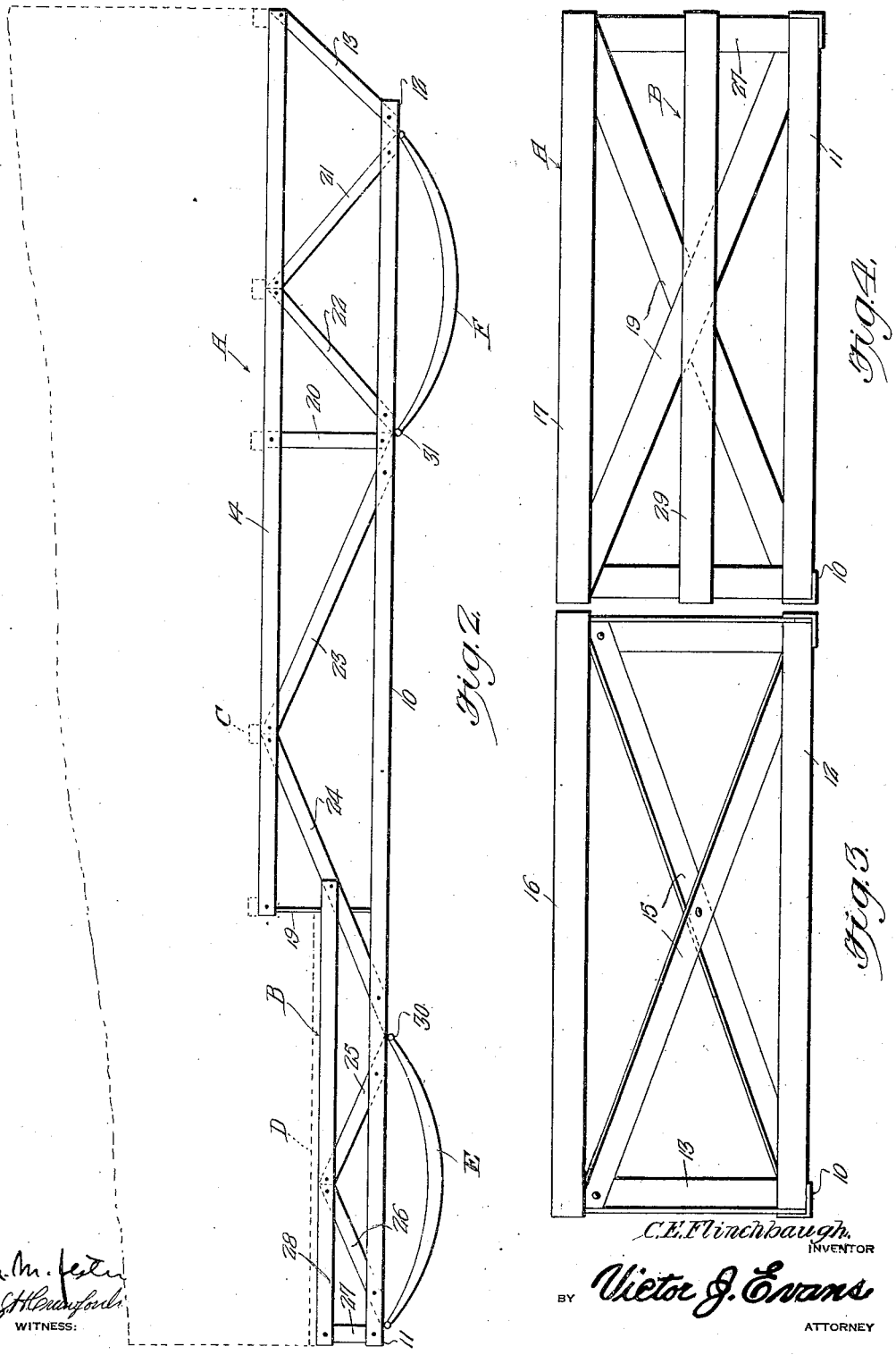

CLARENCE E. FLINCHBAUGH, OF LIMA, OHIO.

MOTOR-TRUCK FRAME.

1,346,744.　　　Specification of Letters Patent.　　Patented July 13, 1920.

Application filed April 24, 1920. Serial No. 376,321.

*To all whom it may concern:*

Be it known that I, CLARENCE E. FLINCHBAUGH, a citizen of the United States of America, residing at Lima, in the county of Allen and State of Ohio, have invented new and useful Improvements in Motor-Truck Frames, of which the following is a specification.

This invention relates to motor vehicles, particularly to the frames thereof, and has for its object the provision of a frame which is primarily so constructed as to prevent buckling or breaking of the frame longitudinally even though enormously heavy strains be imposed thereon.

Another object is the provision of a frame of this character which is so constructed as to obviate the necessity for the employment of the usual longitudinal body sills, the frame being so constructed as to support the cross bars of the body directly and being so constructed that the points beneath the cross bars of the body will be the strongest so as to withstand all strains regardless of the length of wheel base and also regardless of the load supported by the frame, of course within reasonable limits.

A further object is the provision of a frame of this character which has its rear portion offset with respect to the front portion, the rear portion being higher, whereby the front portion will be adapted to support the floor boards in the front part of the cab, the cab and seat being mounted upon the forward end of the highest or offset portion of the frame.

An additional object is the provision of a frame of this character which will be comparatively simple and inexpensive in construction, extremely strong and rigid without having great weight, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a plan view of the frame,

Fig. 2 is a side elevation thereof, a body being shown thereon in dotted lines,

Fig. 3 is a rear end elevation,

Fig. 4 is a front end elevation,

Fig. 5 is a cross sectional view taken near the forward end of the offset portion, Fig. 6 is a cross sectional view taken at the line of the vertical brace members, and Fig. 7 is a longitudinal sectional view.

Referring more particularly to the drawings, the numeral 10 designates a pair of spaced longitudinally extending angle bars which form the lower rails of the frame and these bars are arranged with their flanges in vertical and horizontal position, with the horizontal portions extending toward each other, as clearly shown. At their forward and rear ends these bars are connected by similar cross bars 11 and 12, respectively, which are riveted thereon and which are arranged in the same relation. Secured at the junctures of the bars 10 with the rear cross bar 12, are upwardly and rearwardly inclined bars 13 which are also right angular in cross section and to the upper ends of which are riveted upper bars 14 extending above and in spaced parallel relation to the bars 10. The inclined bars 13 are reinforced by diagonal braces 15 and the rear ends of the bars 14 are connected by a transverse bar 16. The forward ends of the bars 14 are connected by a cross bar 17 beneath which is disposed a cross bar 18 secured to the bars 10. Diagonal braces 19 are secured to the bars 17 and 18, whereby to reinforce the structure.

Midway between the bars 12 and 18 are vertical bars 20 which are riveted to the bars 10 and 14. Secured to the vertical flanges of the bars 10 adjacent the rear ends thereof, are upwardly and forwardly inclined bars 21 which have their upper ends secured to the vertical flanges of the bars 14 and secured at their upper ends to the vertical flanges of the bars 14 adjacent the upper ends of the bars 21, are downwardly and forwardly inclined bars 22 which have their other ends secured to the vertical flanges of the bars 10 and disposed beneath the lower ends of the vertical bars 20. The lower ends of the bars 21 are diagonally cut away for engagement against the horizontal flanges of the bars 10 and their upper ends are mitered for conforming engagement with the mitered upper ends of the bars 22 and the lower ends of the bars 22 are diagonally cut away, as shown, for engagement against the horizontal flanges of the bars 10. It will be observed that the upper ends of the vertical bars 20 are square across and abuttingly engage the horizontal flanges of the bars 14 while their lower ends are diagonally cut away, for conforming engagement against the upper surfaces of the bars 22. It should be stated in passing that the lower ends of the bars 13 and also the upper ends thereof, are diagonally cut away also for conforming engagement with the bars 10 and 14, respectively.

Secured at their lower ends to the vertical flanges of the bars 10, are upwardly and forwardly inclined bars 23 which have their lower ends diagonally cut away for engagement with the horizontal flanges of the bars 10 and which have their upper ends diagonally cut away along vertical lines, as clearly shown. Secured to the vertical flanges of the bars 14 are forwardly and downwardly inclined bars 24 which have their upper ends diagonally cut away for conforming engagement against the cut upper ends of the bars 23 and which have their lower ends diagonally cut away for conforming engagement against the horizontal flanges of the bars 10. Secured at their lower ends to the vertical flanges of the bars 10 are similar forwardly and upwardly inclined bars 25 which have their lower ends diagonally cut away for conforming engagement against the horizontal flanges of the bars 10 and which have their upper ends diagonally cut away along vertical lines, as shown. Secured to the vertical flanges of the bars 10 are rearwardly and upwardly inclined bars 26 which have their upper ends diagonally cut away along vertical lines for conforming engagement against the upper ends of the bars 25 and which have their lower ends diagonally cut away for conforming engagement with the horizontal flanges of the bars 10.

Secured to the forward extremities of the bars 10 at their junctures with the cross bar 11, are vertical bars 27 which are short with respect to the bars 20 and which have secured to their upper ends, horizontal bars 28 which extend rearwardly and which have their rear ends secured to the bars 24 and their intermediate portions secured to the upper ends of the bars 25 and 26. The numeral 29 designates a cross bar which connects the forward extremities of the bars 28 and which is also secured to the upper extremities of the vertical bars 27.

From the foregoing description it will be seen that the frame thus formed includes a rear portion A which is relatively high or offset with respect to the forward portion B. In the actual use of a frame constructed as above described, the body and cab of the truck are adapted to be disposed upon the high or upwardly offset portion A with the cross bars C of the truck body disposed directly upon the bars 14 immediately above the meeting ends of the bars 21 and 22, and 23 and 24, these points being the strongest as being the junctures of the inclined bars.

It will thus be seen that the necessity for the usual longitudinal body sills is eliminated. The lower portion of the frame B is adapted to support the floor boards D.

It is of course necessary to provide for spring suspension or support and to this end I provide springs hangers 30 disposed below the bars 10 at the forward frame portion B and other spring hangers 31 disposed below the members 10 adjacent the rear portion of the frame and associated with these hangers are springs conventionally illustrated at E and F, respectively.

In the use of a frame constructed in accordance with my invention, it will be obvious that great strength is attained as the points of greatest strain are located immediately above the meeting ends of the various inclined brace bars, and as these brace bars are not only rigidly secured to the upper and lower longitudinal bars but also have their abutting ends conformingly engaged and their frame bar engaging ends diagonally cut away for abutting engagement therewith, it will be readily apparent that the maximum strength is secured so that longitudinal buckling, bending or breaking of the frame will be prevented even though excessively heavy loads are carried and even though an unusually long wheel base be provided.

From the foregoing description and a study of the drawings it will be apparent that I have thus provided a highly efficient and durable frame construction which is simple, which includes few parts, and which will efficiently perform every function for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. A motor truck frame comprising lower longitudinal angle bars arranged in spaced parallel relation and connected at their forward and rear ends by transverse angle bars, a cross member connecting said bars at a point spaced from the front extremities, rearwardly and upwardly inclined bars secured at the junctures of said longitudinal bars with the rear cross bar, vertical bars rising from said longitudinal bars between said rear cross bar and said intermediate cross bar, upper longitudinal bars secured to the upper ends of said inclined bars and the upper ends of said vertical bars, cross bars connecting the forward and rear ends of said last named longitudinal bars, diagonal braces connecting said intermediate cross bar and the forward cross bar connecting the forward extremities of said last named longitudinal bars, diagonal braces connecting the end portions of said inclined bars, said plurality of oppositely inclined braces connected with said first and second named longitudinal bars and having their end portions arranged in abutting relation, longitudinal bars disposed above said first named longitudinal bars between the cross bars connecting the forward extremities thereof and said intermediate cross bar, a cross bar connecting the forward extremities of said last named bars, vertical bars secured to the forward corners of the first named bars at their junctures with the cross bar connecting them and also connected with the forward extremities of said last named longitudinal bars, and inclined brace bars secured to said first and last named longitudinal bars.

2. A motor truck frame comprising lower longitudinal angle bars arranged in spaced parallel relation and connected at their forward and rear ends by transverse angle bars, a cross bar connecting said bars at a point spaced from the front extremities, rearwardly and upwardly inclined bars secured at the junctures of said longitudinal bars with the rear cross bar, vertical bars rising from said longitudinal bars between said rear cross bar and said intermediate cross bar, upper longitudinal bars secured to the upper ends of said inclined bars and the upper ends of said vertical bars, cross bars connecting the forward and rear ends of said last named longitudinal bars, diagonal braces connecting said intermediate cross bar and the forward cross bar connecting the forward extremities of said last named longitudinal bars, diagonal braces connecting the end portions of said inclined bars, and a plurality of inclined brace bars secured to the vertical flanges of said first and second named longitudinal bars and arranged with their ends in abutting relation.

In testimony whereof I affix my signature.

CLARENCE E. FLINCHBAUGH.